United States Patent [19]

Wong Shing et al.

[11] Patent Number: 5,750,034
[45] Date of Patent: May 12, 1998

[54] HYDROPHILIC DISPERSION POLYMERS FOR THE CLARIFICATION OF DEINKING PROCESS WATERS

[75] Inventors: Jane B. Wong Shing, Aurora; Karen R. Tubergen, Mt. Prospect, both of Ill.

[73] Assignee: Nalco Chemical Company, Naperville, Ill.

[21] Appl. No.: 743,437

[22] Filed: Nov. 1, 1996

[51] Int. Cl.⁶ .................................. C02F 1/24; C02F 1/56
[52] U.S. Cl. .......................... 210/705; 210/727; 210/733; 210/734; 210/917; 210/928; 162/5; 162/189
[58] Field of Search ................................ 210/705, 727, 210/734, 733, 917, 928; 162/5, 189, 190

[56] References Cited

U.S. PATENT DOCUMENTS

| | | |
|---|---|---|
| 4,715,962 | 12/1987 | Bhattacharyya . |
| 4,738,750 | 4/1988 | Ackel . |
| 4,874,521 | 10/1989 | Newman . |
| 4,929,655 | 5/1990 | Takeda . |
| 5,006,590 | 4/1991 | Takeda . |
| 5,013,456 | 5/1991 | St.John . |
| 5,032,286 | 7/1991 | Newman . |
| 5,178,770 | 1/1993 | Chung . |
| 5,292,793 | 3/1994 | Ramesh . |
| 5,308,499 | 5/1994 | Dixon . |
| 5,314,627 | 5/1994 | Ramesh . |
| 5,454,988 | 10/1995 | Albrecht . |
| 5,587,415 | 12/1996 | Takeda . |

Primary Examiner—Thomas M. Lithgow
Attorney, Agent, or Firm—Robert A. Miller; Kelly L. Cummings; James J. Drake

[57] ABSTRACT

The invention comprises a method for clarifying ink-laden water obtained from the recycling of paper stocks by treating said water with a conventional coagulant followed by treatment with a hydrophilic dispersion polymer. The hydrophilic dispersion flocculant of the invention is a copolymer of dimethylaminoethyl (meth)acrylate methyl chloride quat (DMAEA·MCQ) cationic monomer and (meth)acrylamide (AcAm). Following dosing with the flocculant, a floc is formed. The floc contains ink and impurities which are removed from the water process stream by means of solid liquid separation; the solid liquid separation comprising a dissolved air flotation method.

7 Claims, 3 Drawing Sheets

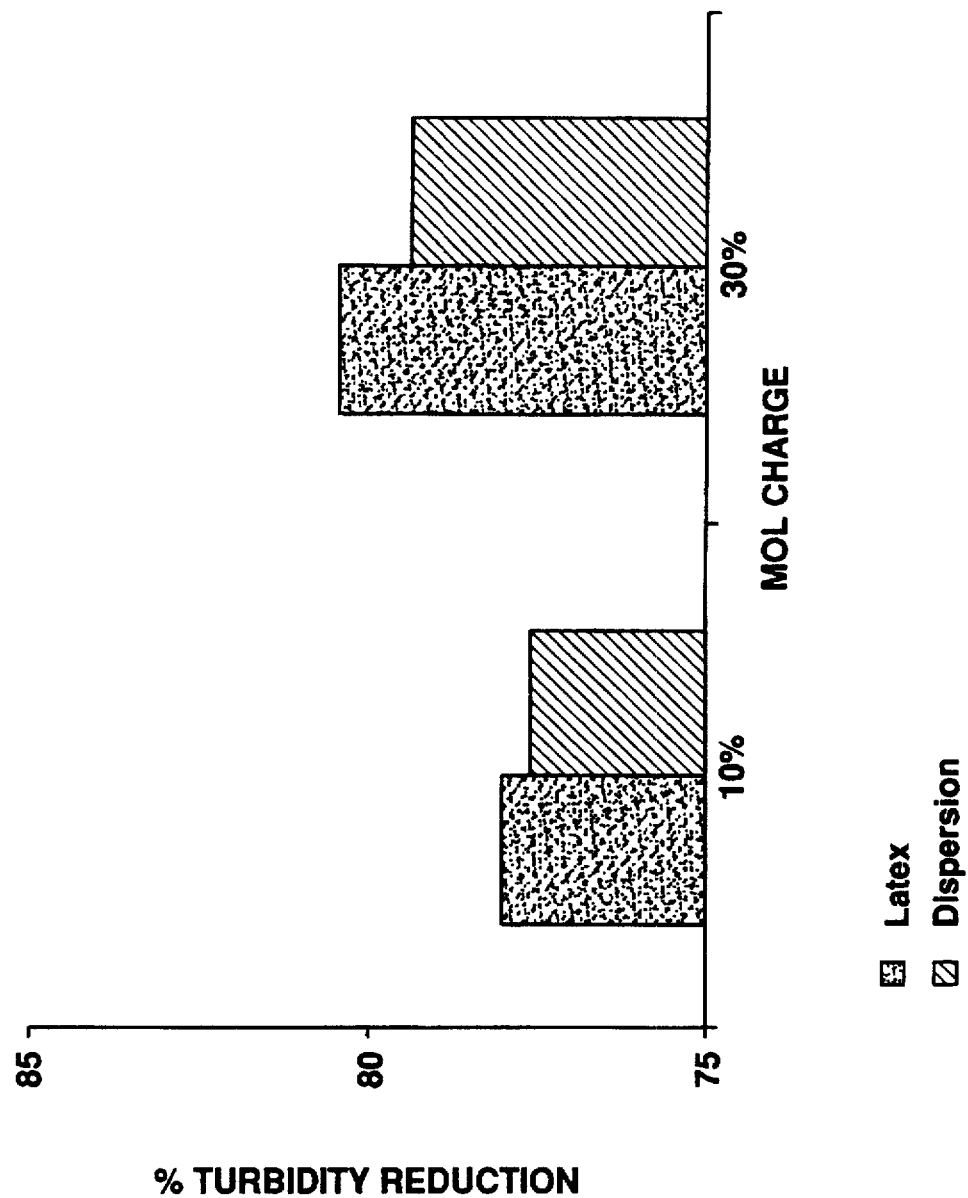

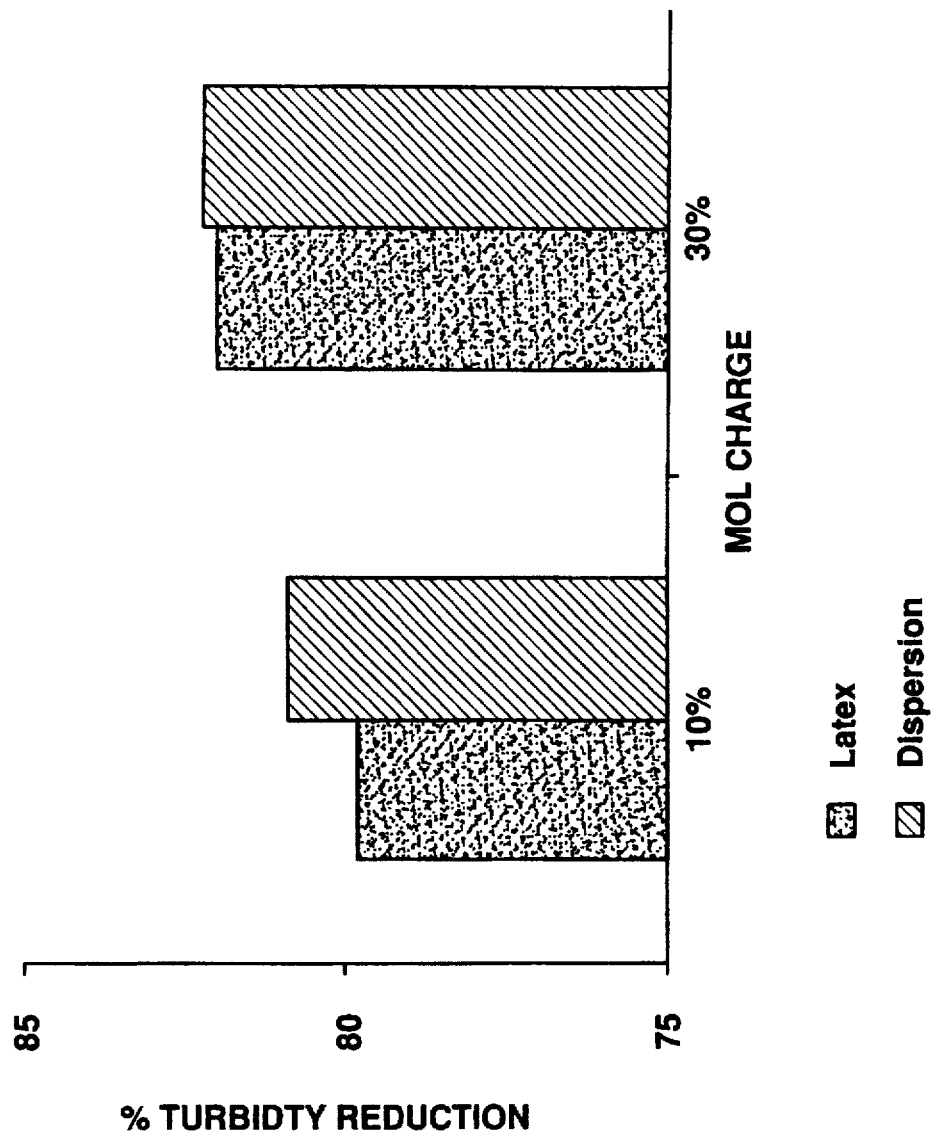

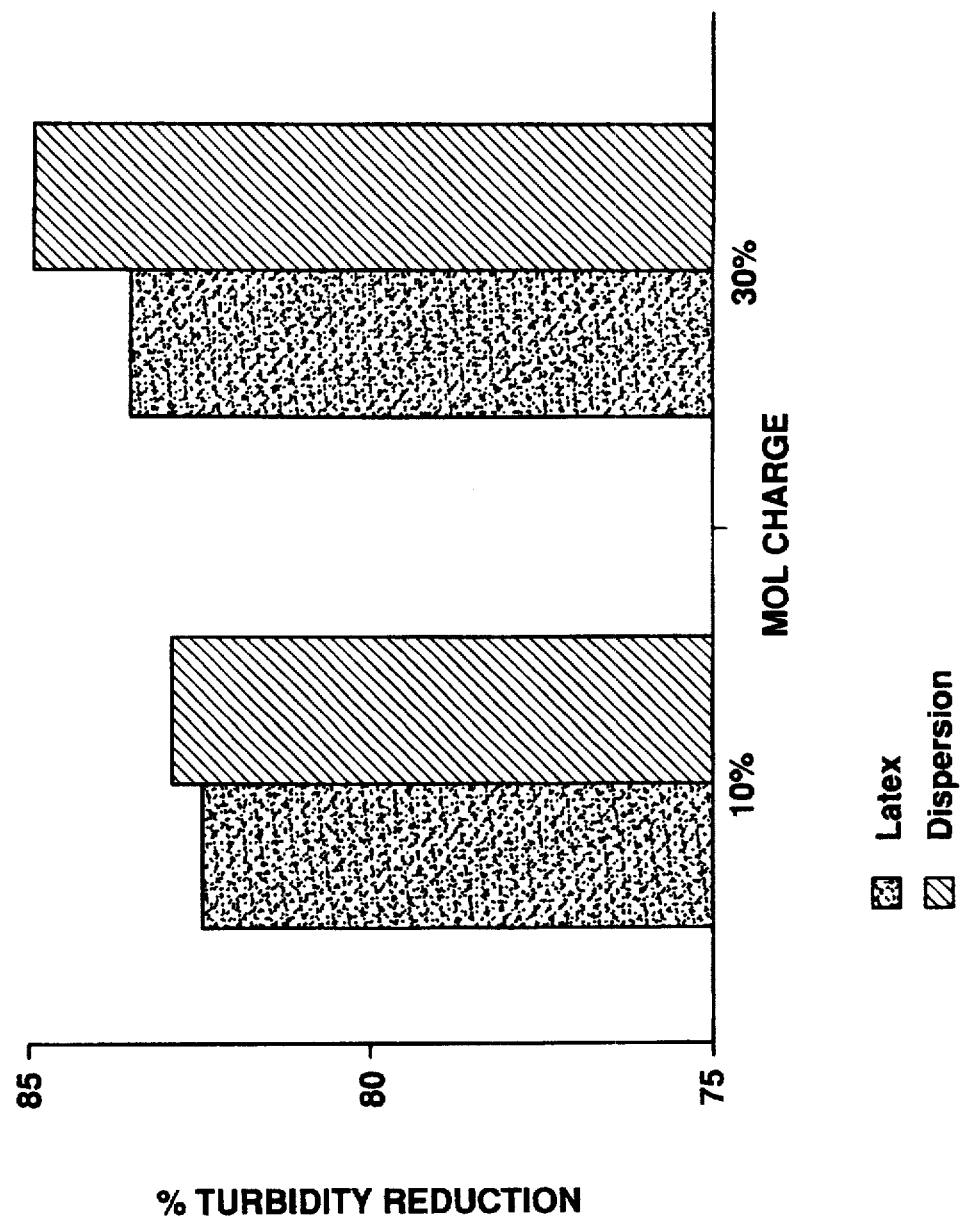

HYDROPHILIC DISPERSION POLYMERS FOR THE CLARIFICATION OF DEINKING PROCESS WATERS

BACKGROUND OF THE INVENTION

1. Field of the Invention

The invention relates to the clarification of deinking process waters which result from the recycling of paper stocks. More specifically, the present invention relates to the use of hydrophilic dispersion copolymers of DMAEA·MCQ and acrylamide as water clarifying agents for deinking influents.

2. Description of the Prior Art

Recycled paper is increasingly used as a pulp source. One of the major pulping steps involves removal of the ink from any source of printed recycled paper. Large volumes of water are required for the ink removal process and its clean-up is accomplished using a solids/liquid separation unit operation. Dissolved air flotation (DAF) is commonly used. Recycle mills are most frequently located in the metropolitan areas where an emphasis on closing the water cycle of the mill is great. Consequently, effective clean-up of the deinking wash waters becomes important because reuse of the water generated e.g. from a DAF, can lead to reduced sheet quality such as brightness. Also, if these waters are used for other purposes, minimizing the amounts of BOD/-COD and suspended solids is desirable.

Clarification chemicals are typically utilized in conjunction with mechanical clarifiers for the removal of solids from the process water stream. The clarification chemicals coagulate and/or flocculate the suspended solids into larger particles, which can then be removed from the process stream by gravitational settling or flotation. Depending upon the characteristics of the individual waters, differing chemical types and programs may be utilized.

Clarification generally refers to the removal of nonsettleable material by coagulation, flocculation and sedimentation. Coagulation is the process of destabilization by charge neutralization. Once neutralized, particles no longer repel each other and can be brought together. Coagulation is necessary for removal of colloidal sized suspended matter. Flocculation is the process of bringing together the destabilized, "coagulated" particles to form a larger agglomeration or floc.

Often a dual polymer program is the treatment of choice for clarification of deinking process waters by dissolved air flotation. Typically, this comprises a low molecular weight cationic coagulant followed by a high molecular weight flocculant. The preferred flocculant of the invention is a hydrophilic dispersion copolymer of dimethylaminoethyl acrylate methylchloride quaternary salt, DMAEA·MCQ and acrylamide. The use of these flocculants affords removal of particulate materials without the unwanted addition of oils and surfactants contained in conventional latex polymers. Additionally, these flocculants require no inverter system and can be introduced to the paper process stream using simple feeding equipment.

It is customary to use coagulants prior to using flocculants in the deinking process waters to provide charge neutralization. This affords efficient solids removal. A variety of polymeric coagulants may be employed depending upon the particular deinking waste water treated.

SUMMARY OF THE INVENTION

The invention comprises a method for clarifying ink-ladened water obtained from the recycling of paper stocks by treating said water with a coagulant followed by treatment with a hydrophilic dispersion polymer. The hydrophilic dispersion polymer comprises (a) a cationic monomer represented by the following general formula (I):

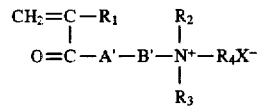

wherein R1 is H or CH3; each of R2 and R3 is an alkyl group having 1 to 2 carbon atoms; R4 is H or an alkyl group of 1 to 2 carbon atoms; A' is an oxygen atom or NH; B' is an alkylene group of 2 to 4 carbon atoms or a hydroxypropylene group; and X- is an anionic counterion; and (b) a second monomer represented by (meth)acrylamide (in an aqueous solution of a polyvalent anionic salt), wherein the polymerization is carried out in the presence of either an organic high-molecular weight multivalent cation comprising a water-soluble polymer containing at least one monomer of formula (I) and/or poly diallyl dimethyl ammonium chloride (DADMAC). Resultant from the addition of the polymers is a clarified process water stream and highly flocculated solids, the latter being readily handled by ordinary solid/liquid separation processes, such as a dissolved air flotation method.

BRIEF DESCRIPTION OF THE DRAWINGS

FIG. 1 is a graph comparing turbidity reduction of the 10% and 30% mol DMAEA·MCQ latex with dispersion polymers in the presence of 30 parts per million of Composition A.

FIG. 2 is a graph comparing turbidity reduction of the 10% and 30% mol DMAEA·MCQ latex with dispersion polymers in the presence of 30 parts per million of Composition B.

FIG. 3 is a graph comparing turbidity reduction of the 10% and 30% mol DMAEA·MCQ latex with dispersion polymers in the presence of 30 parts per million of Composition C.

DESCRIPTION OF THE PREFERRED EMBODIMENTS

The invention comprises a method for clarifying ink-ladened water obtained from the recycling of paper stocks by treating said water with a conventional coagulant followed by treatment with a hydrophilic dispersion polymer.

Preferably, the hydrophilic dispersion polymer of the invention is a copolymer of dimethylaminoethyl (meth) acrylate methyl chloride quat (DMAEA·MCQ) cationic monomer and (meth)acrylamide (AcAm). It has been found that the polymer described above confers advantages for use in a papermaking process. Specifically, the hydrophilic dispersion polymers of the invention show improved or equal activity with respect to deinking process water clarification as compared to the commercial standard DMAEA methyl chloride quaternary latex of the same charge. The use of these flocculants affords removal of particulate materials without the unwanted addition of oils and surfactants contained in conventional latex polymers. Additionally, these flocculants require no inverter system and can be introduced to the paper process stream using simple feeding equipment. Latex is defined within this application as an inverse water-in-oil emulsion polymer.

Examples 1 and 2 below outline processes for preparing the copolymer at various ratios of the monomer components.

Preferably, the amount of dimethylaminoethyl acrylate methyl chloride quaternary present in the copolymer is from about 3 mole percent to about 30 mole percent. Preferably, the hydrophilic dispersion polymer has a cationic charge of from about 1% mol to about 30% mol. Further, the range of intrinsic viscosities for the hydrophilic dispersion polymers of the invention is preferably from about 11.9 to about 21.2 dl/g. According to the preferred method of the invention, the dispersion polymer is added in an amount from about 0.1 to about 100 ppm on a products basis.

The recycled paper effluent is initially treated with a coagulant to produce a coagulated effluent. This step functions to generally aggregate ink impurities in the effluent together. However, the aggregation of the impurities does not form them into particulates which are amenable to removal by mechanical solids liquid separation processes. As stated above, it is customary to use coagulants prior to using flocculants in the deinking process waters to provide charge neutralization. A variety of polymeric coagulants may be employed depending upon the particular deinking waste water treated. For a more detailed description of conventional polymeric coagulants see the Nalco Water Handbook, Second Edition, 1988, McGraw-Hill, Inc., the disclosure of which is incorporated herein by reference. The use of coagulants is conventional and does not form a part of this invention.

In order to accomplish the solid/liquid separation distinct bodies, or flocs, must be formed with the aid of a flocculant. The preferred flocculant of the invention is a copolymer of dimethylaminoethyl (meth)acrylate methyl chloride quat (DMAEA·MCQ) cationic monomer and (meth)acrylamide (AcAm). Preferably, the flocculant has an intrinsic viscosity of from about 10.0 to about 22.0 deciliters per gram (dl/g).

The flocculant is believed to cause the aggregation of neutralized colloidal particles which are suspended in the paper process water stream. Aggregation is the result of either entrapping agents (i.e., inorganic flocculants) or bonding agents (i.e., organic flocculants) bringing the neutralized particles together.

A dual polymer treatment generally comprises a low molecular weight cationic coagulant in combination with a high molecular weight flocculant. Typical cationic coagulants are poly(diallyldimethyl ammonium chloride), amphoteric diallyldimethyl ammonium chloride/acrylic acid containing copolymers, condensation polymers of ethylene dichloride/ammonia or dimethylamine/epichlorohydrin. Conventional acrylamide-based flocculants have been utilized to assist in the solid/liquid separation.

Traditionally, coagulants are preferably added to the system in solution form prior to the DAF unit while the flocculants are added to the DAF unit following dissolved air injection. The flocculants are added in an effective amount, generally between about 0.5–10 ppm.

The following examples are presented to describe preferred embodiments and utilities of the invention and are not meant to limit the invention unless otherwise stated in the claims appended hereto.

EXAMPLE

Example 1 - Process for Synthesizing Dispersion Copolymers of Acrylamide and 3 mole % DMAEA·MCQ.

To a two-liter resin reactor equipped with stirrer, temperature controller, and water cooled condenser, was added 287.59 grams of a 48.1% solution of acrylamide (1.9461 moles), 7.24 grams of an 80.6% solution of DMAEA·MCQ (0.0301 moles), 250 grams of ammonium sulfate, 225.59 grams of deionized water, 27 grams of glycerol, 56.25 grams of a 16% solution of polyDADMAC (poly diallyl dimethyl ammonium chloride)(IV=1.5 dl/gm), 18 grams of a 20% solution of polyDMAEA·MCQ (IV=2.0dl/gm), and 0.3 grams of EDTA. The mixture was heated to 48° C. and 0.50 grams of a 4% solution of 2,2' Azobis(2 amidinopropane) dihydrochloride was added. The resulting solution was sparged with 1000 cc/min. of nitrogen. After 15 minutes, polymerization began and the solution became viscous. Over the next 4 hours the temperature was maintained at 48° C. and a solution containing 95.86 grams (0.6487 moles) of 48.1% acrylamide, 12.07 grams (0.0502 moles) of an 80.6% solution of DMAEA·MCQ, 9 grams of glycerol and 0.1 gram of EDTA was pumped into the reactor using a syringe pump. To the resulting polymer dispersion was added 0.50 grams of a 4% solution of 2,2' Azobis(2 amidinopropane) dihydrochloride. The dispersion was then further reacted for 2.5 hours at a temperature of 48° C. to 55° C. The resulting polymer dispersion had a Brookfield viscosity of 5600 cps. To the above dispersion was added 10 grams of 99% acetic acid and 20 grams of sodium sulfate. The resulting dispersion had a Brookfield viscosity of 1525 cps and contained 20% of a 97/3 copolymer of acrylamide and DMAEA·MCQ with an intrinsic viscosity of 12.1 dl/gm in 0.125 molar $NaNO_3$.

Example 2 - Process for Synthesizing Dispersion Copolymers of Acrylamide and 10 mole % DMAEA·MCQ.

To a two-liter resin reactor equipped with stirrer, temperature controller, and water cooled condenser, was added 239.38 grams of a 48.1% solution of acrylamide (1.6199 moles), 21.63 grams of an 80.6% solution of DMAEA·MCQ (0.09001 moles), 260 grams of ammonium sulfate, 258.01 grams of deionized water, 18 grams of glycerol, 33.75 grams of a 16% solution of polyDADMAC (IV=1.5 dl/gm), 36 grams of a 20% solution of polyDMAEA·MCQ (IV=2.0dl/gm), and 0.3 grams of EDTA. The mixture was heated to 48° C. and 0.50 grams of a 4% solution of 2,2' Azobis(2 amidinopropane) dihydrochloride was added. The resulting solution was sparged with 1000 cc/min. of nitrogen. After 15 minutes, polymerization began and the solution became viscous. Over the next 4 hours the temperature was maintained at 48° C. and a solution containing 79.79 grams (0.5399 moles) of 48.1% acrylamide, 36.04 grams (0.1500 moles) of an 80.6% solution of DMAEA·MCQ, 6 grams of glycerol and 0.1 gram of EDTA was pumped into the reactor using a syringe pump. To the resulting polymer dispersion was added 0.50 grams of a 4% solution of 2,2' Azobis(2 amidinopropane) dihydrochloride. The dispersion was then further reacted for 2.5 hours at a temperature of 48° C. to 55° C. The resulting polymer dispersion had a Brookfield viscosity of 7600 cps. To the above dispersion was added 10 grams of 99% acetic acid and 20 grams of sodium sulfate. The resulting dispersion had a Brookfield viscosity of 2100 cps and contained 20% of a 90/10 copolymer of acrylamide and DMAEA·MCQ with an intrinsic viscosity of 15.5 dl/gm in 0.125 molar $NaNO_3$.

Dissolved Air Flotation Water Samples

Synthetic samples were prepared in the laboratory under the following conditions. A mixture of oil-based printed newsprint (70 wt%) and magazine (30 wt%) was repulped (4.5% consistency, 45° C., 30 min.) with sodium hydroxide (0.5% based on paper), sodium silicate (2.0%), surfactant (0.5%, ethoxylated linear alcohol, HLB 14.5), chelant (0.25%, DTPA, diethylenetriaminepentaacetic acid), and hydrogen peroxide (1.0%). The deinking water was mechanically extracted, collected, and diluted ~3-fold.

A sample of DAF influent was obtained from a Midwestern tissue manufacturer wherein the furnish was a typical newsprint magazine composition. Total solids in this influent were 4500 ppm with a solution pH of 7. All samples were stored at 4° C. and tested within five days.

Polymer Evaluation

Polymers and their respective descriptions used in this invention are summarized in Table I.

Typical jar testing methods were used to monitor polymer performance. Standard coagulants were prepared as 1% (actives) solutions and flocculants as ~0.1% (product) solutions in deionized water. Dosages reported are based on actives for coagulants and as product for flocculants. Samples of the deinking influent were stirred at 200 rpm (fast mix) for 3 min. wherein the coagulant was added at the beginning of the fast mix and the flocculant during the last 40 seconds of the fast mix. This was followed by a slow mix of 25 rpm for 2 minutes. The samples were allowed to settle for 5 minutes and an aliquot of the upper liquid layer was removed and diluted appropriately when required. Turbidity measurements were acquired with a HACH DR-2000 at 450 nm.

Example 3

Initial screening of the proprietary dispersion DMAEA·MCQ/AcAm flocculants were performed on a synthetic water sample prepared as described above. Table II summarizes the data used to determine the optimal coagulant concentration for subsequent flocculant studies. The coagulants screened, Composition A (linear Epi/DMA), Composition B (polyDADMAC), and Composition C (90/10 DADMAC/AA), are commonly used in DAF systems. Optimal coagulant performance with the cationic flocculant Composition D (latex 10% DMAEA·MCQ/AcAm) was obtained at 15 ppm for Composition A, 10 ppm for Composition B, and 15 ppm for Composition C. A dose of 15 ppm for each coagulant was subsequently used during the screening of the dispersion flocculants.

Tables III–V summarize the results of the DMAEA·MCQ dispersion polymer screening studies in conjunction with Composition A, Composition B, and Composition C, respectively. It is apparent that for each coagulant, the charge on the flocculant minimally affected the reduction in turbidity. Also, there was little difference in the turbidity values obtained at 5 ppm versus 3 ppm flocculant for a given coagulant.

By in large, the dispersion flocculants performed as well as their similarity charged latex twins.

Example 4

The series of DMAEA·MCQ/AcAm copolymers were also screened in a recycle mill sample. Table VI summarizes the data used to determine the optimal coagulant concentration for the ensuing flocculant studies. Not surprisingly, higher amounts of coagulant were required to clarify the mill water compared to the synthetic water. In subsequent studies, for each coagulant the concentration was held at 30 ppm.

Tables VII–IX display the results for the DMAEA·MCQ/AcAm copolymers and their ability to aid in the clarification of the mill water. When the hydrophilic dispersion flocculants were used in conjunction with Composition A (Table VII) or Composition B (Table VIII), an increase in the amount of DMAEA·MCQ present in the copolymer slightly enhanced the reduction in turbidity. However, this was not the case with the polyampholyte, Composition C, wherein minimal differences were obtained in turbidity reductions as a function of the flocculant's cationic charge. In each series, increasing the concentration of flocculant from 3 to 5 ppm did not enhance turbidity reduction.

Comparison of the 10% and 30% mol DMAEA·MCQ latex and dispersion polymers (at 5 ppm) are shown in FIGS. 1–3. For this mill sample, the dispersion flocculants performed as well as, or slightly better than, their latex twin.

TABLE I

POLYMER DESCRIPTION

| Coagulants | | Intrinsic Viscosity (dl/g) |
|---|---|---|
| Composition A | Epi/DMA, linear solution polymer | 0.11 |
| Composition B | poly (DADMAC), solution polymer | 0.45 |
| Composition C | 90/10 DADMAC/AA solution polymer | 1.2 |
| Dispersions | | |
| Composition D | 1 mol % DMAEA.MCQ/AcAm | 11.9 |
| Composition E | 3 mol % DMAEA.MCQ/AcAm | 15.7 |
| Composition F | 5 mol % DMAEA.MCQ/AcAm | 14.1 |
| Composition G | 10 mol % DMAEA.MCQ/AcAm | 17.0 |
| Composition H | 20 mol % DMAEA.MCQ/AcAm | 21.2 |
| Composition I | 30 mol % DMAEA.MCQ/AcAm | 17.0 |
| Latex Polymers | | |
| Composition J | 10 mol % DMAEA.MCQ/AcAm | 18.0 |
| Composition K | 30 mol % DMAEA.MCQ/AcAm | 20.0 |

Epi/DMA epichlorohydrin/dimethylamine
DADMAC diallyldimethyl ammonium chloride
AA acrylic acid
DMAEA.MCQ dimethylaminoethylacrylate methylchloride quaternary salt
AcAm acrylamide

TABLE II

Coagulant Dosage Optimization (Synthetic DAF Water)

| Coagulant | Dosage (ppm) | Flocculant | Dosage (ppm) | Turbidity (FTU) | % Turbidity Reduction |
|---|---|---|---|---|---|
| Control | | | | 415 | |
| Composition A | 5 | Composition J | 5 | 276 | 33.49 |
| Composition A | 10 | Composition J | 5 | 31 | 92.53 |
| Composition A | 15 | Composition J | 5 | 15 | 96.39 |
| Composition A | 20 | Composition J | 5 | 20 | 95.18 |
| Composition A | 40 | Composition J | 5 | 154 | 62.89 |
| Composition B | 5 | Composition J | 5 | 244 | 41.20 |
| Composition B | 10 | Composition J | 5 | 19 | 95.42 |
| Composition B | 15 | Composition J | 5 | 27 | 93.49 |
| Composition B | 20 | Composition J | 5 | 218 | 47.47 |
| Composition C | 5 | Composition J | 5 | 282 | 32.05 |
| Composition C | 10 | Composition J | 5 | 58 | 86.02 |
| Composition C | 15 | Composition J | 5 | 39 | 90.60 |
| Composition C | 20 | Composition J | 5 | 246 | 40.72 |

TABLE III

Screening of DMAEA.MCQ Dispersion Polymers (Synthetic DAF Water)

| Coagulant | Dosage (ppm) | Flocculant | Mole % DMAEA. MCQ | Dosage (ppm) | Turbidity (FTU) | % Turbidity Reduction |
|---|---|---|---|---|---|---|
| Control | | | | | 415 | |
| Composition A | 15 | Composition J | 10 | 5 | 15 | 96.39 |
| Composition A | 15 | Composition J | 10 | 3 | 13 | 96.87 |
| Composition A | 15 | Composition K | 30 | 5 | 11 | 97.35 |
| Composition A | 15 | Composition K | 30 | 3 | 10 | 97.59 |
| Composition A | 15 | Composition D | 1 | 5 | 18 | 95.66 |
| Composition A | 15 | Composition E | 3 | 5 | 18 | 95.66 |
| Composition A | 15 | Composition F | 5 | 5 | 21 | 94.94 |
| Composition A | 15 | Composition G | 10 | 5 | 15 | 96.39 |
| Composition A | 15 | Composition H | 20 | 5 | 16 | 96.14 |
| Composition A | 15 | Composition I | 30 | 5 | 10 | 97.59 |
| Composition A | 15 | Composition D | 1 | 3 | 16 | 96.14 |
| Composition A | 15 | Composition E | 3 | 3 | 17 | 95.90 |
| Composition A | 15 | Composition F | 5 | 3 | 16 | 96.14 |
| Composition A | 15 | Composition G | 10 | 3 | 12 | 97.11 |
| Composition A | 15 | Composition H | 20 | 3 | 10 | 97.59 |
| Composition A | 15 | Composition I | 30 | 3 | 8 | 98.07 |

TABLE IV

Screening of DMAEA.MCQ Dispersion Polymers (Synthetic DAF Water)

| Coagulant | Dosage (ppm) | Flocculant | Mole % DMAEA. MCQ | Dosage (ppm) | Turbidity (FTU) | % Turbidity Reduction |
|---|---|---|---|---|---|---|
| Control | | | | | 415 | |
| Composition B | 15 | Composition J | 10 | 5 | 27 | 93.49 |
| Composition B | 15 | Composition J | 10 | 3 | 28 | 93.25 |
| Composition B | 15 | Composition K | 30 | 5 | 21 | 94.94 |
| Composition B | 15 | Composition K | 30 | 3 | 21 | 94.94 |
| Composition B | 15 | Composition D | 1 | 5 | 17 | 95.90 |
| Composition B | 15 | Composition E | 3 | 5 | 22 | 94.70 |
| Composition B | 15 | Composition F | 5 | 5 | 20 | 95.18 |
| Composition B | 15 | Composition G | 10 | 5 | 17 | 95.90 |
| Composition B | 15 | Composition H | 20 | 5 | 21 | 94.94 |
| Composition B | 15 | Composition I | 30 | 5 | 23 | 94.46 |
| Composition B | 15 | Composition D | 1 | 3 | 28 | 93.25 |
| Composition B | 15 | Composition E | 3 | 3 | 27 | 93.49 |
| Composition B | 15 | Composition F | 5 | 3 | 24 | 94.22 |
| Composition B | 15 | Composition G | 10 | 3 | 19 | 95.42 |
| Composition B | 15 | Composition H | 20 | 3 | 20 | 95.18 |
| Composition B | 15 | Composition I | 30 | 3 | 20 | 95.18 |

TABLE V

Screening of DMAEA.MCQ Dispersion Polymers (Synthetic DAF Water)

| Coagulant | Dosage (ppm) | Flocculant | Mole % DMAEA. MCQ | Dosage (ppm) | Turbidity (FTU) | % Turbidity Reduction |
|---|---|---|---|---|---|---|
| Control | | | | | 415 | |
| Composition C | 15 | Composition J | 10 | 5 | 39 | 90.60 |
| Composition C | 15 | Composition J | 10 | 3 | 30 | 92.77 |
| Composition C | 15 | Composition K | 30 | 5 | 20 | 95.18 |
| Composition C | 15 | Composition K | 30 | 3 | 62 | 85.06 |
| Composition C | 15 | Composition D | 1 | 5 | 30 | 92.77 |
| Composition C | 15 | Composition E | 3 | 5 | 47 | 88.67 |
| Composition C | 15 | Composition F | 5 | 5 | 19 | 95.42 |
| Composition C | 15 | Composition G | 10 | 5 | 36 | 91.33 |
| Composition C | 15 | Composition H | 20 | 5 | 28 | 93.25 |
| Composition C | 15 | Composition I | 30 | 5 | 20 | 95.18 |
| Composition C | 15 | Composition D | 1 | 3 | 34 | 91.81 |
| Composition C | 15 | Composition E | 3 | 3 | 46 | 88.92 |

TABLE V-continued

Screening of DMAEA.MCQ Dispersion Polymers
(Synthetic DAF Water)

| Coagulant | Dosage (ppm) | Flocculant | Mole % DMAEA. MCQ | Dosage (ppm) | Turbidity (FTU) | % Turbidity Reduction |
|---|---|---|---|---|---|---|
| Composition C | 15 | Composition F | 5 | 3 | 28 | 93.25 |
| Composition C | 15 | Composition G | 10 | 3 | 23 | 94.46 |
| Composition C | 15 | Composition H | 20 | 3 | 58 | 86.02 |
| Composition C | 15 | Composition I | 30 | 3 | 31 | 92.53 |

TABLE VI

Coagulant Dosage Optimization
(A Midwestern Tissue Mill DAF Water)

| Coagulant | Dosage (ppm) | Flocculant | Dosage (ppm) | Turbidity Units (FTU) | Turbidity Reduction |
|---|---|---|---|---|---|
| Control | | | | 450 | |
| Composition A | 5 | Composition J | 5 | 157 | 65.11 |
| Composition A | 10 | Composition J | 5 | 133 | 70.44 |
| Composition A | 20 | Composition J | 5 | 108 | 76.00 |
| Composition A | 30 | Composition J | 5 | 99 | 78.00 |
| Composition A | 40 | Composition J | 5 | 101 | 77.56 |
| Composition A | 50 | Composition J | 5 | 94 | 79.11 |
| Composition B | 5 | Composition J | 5 | 119 | 73.56 |
| Composition B | 10 | Composition J | 5 | 107 | 76.22 |
| Composition B | 20 | Composition J | 5 | 91 | 79.78 |
| Composition B | 30 | Composition J | 5 | 91 | 79.78 |
| Composition B | 40 | Composition J | 5 | 89 | 80.22 |
| Composition C | 5 | Composition J | 5 | 114 | 74.67 |
| Composition C | 10 | Composition J | 5 | 98 | 78.22 |
| Composition C | 20 | Composition J | 5 | 85 | 81.11 |
| Composition C | 30 | Composition J | 5 | 79 | 82.44 |
| Composition C | 40 | Composition J | 5 | 106 | 76.44 |

TABLE VII

Screening of DMAEA.MCQ Dispersion Polymers
(A Midwestern Tissue Mill DAF Water)

| Coagulant | Dosage (ppm) | Flocculant | Mole % DMAEA. MCQ | Dosage (ppm) | Turbidity (FTU) | % Turbidity Reduction |
|---|---|---|---|---|---|---|
| Control | | | | | 450 | |
| Composition A | 30 | Composition J | 10 | 3 | 114 | 74.67 |
| Composition A | 30 | Composition J | 10 | 5 | 99 | 78.00 |
| Composition A | 30 | Composition J | 10 | 10 | 92 | 79.56 |
| Composition A | 30 | Composition J | 10 | 15 | 92 | 79.56 |
| Composition A | 30 | Composition K | 30 | 3 | 95 | 78.89 |
| Composition A | 30 | Composition K | 30 | 5 | 88 | 80.44 |
| Composition A | 30 | Composition D | 1 | 3 | 127 | 71.78 |
| Composition A | 30 | Composition E | 3 | 3 | 127 | 71.78 |
| Composition A | 30 | Composition F | 5 | 3 | 118 | 73.78 |
| Composition A | 30 | Composition G | 10 | 3 | 103 | 77.11 |
| Composition A | 30 | Composition H | 20 | 3 | 102 | 77.33 |
| Composition A | 30 | Composition I | 30 | 3 | 98 | 78.22 |
| Composition A | 30 | Composition D | 1 | 5 | 128 | 71.56 |
| Composition A | 30 | Composition E | 3 | 5 | 135 | 70.00 |
| Composition A | 30 | Composition F | 5 | 5 | 122 | 72.89 |
| Composition A | 30 | Composition G | 10 | 5 | 101 | 77.56 |
| Composition A | 30 | Composition H | 20 | 5 | 95 | 78.89 |
| Composition A | 30 | Composition I | 30 | 5 | 93 | 79.33 |

TABLE VIII

Screening of DMAEA.MCQ Dispersion Polymers
(A Midwestern Tissue Mill DAF Water)

| Coagulant | Dosage (ppm) | Flocculant | Mole % DMAEA.MCQ | Dosage (ppm) | Turbidity Units (FTU) | % Turbidity Reduction |
|---|---|---|---|---|---|---|
| Control | | | | | 450 | |
| Composition B | 30 | Composition J | 10 | 3 | 130 | 71.11 |
| Composition B | 30 | Composition J | 10 | 5 | 91 | 79.78 |
| Composition B | 30 | Composition K | 30 | 3 | 82 | 81.78 |
| Composition B | 30 | Composition K | 30 | 5 | 81 | 82.00 |
| Composition B | 30 | Composition D | 1 | 3 | 106 | 76.44 |
| Composition B | 30 | Composition E | 3 | 3 | 112 | 75.11 |
| Composition B | 30 | Composition F | 5 | 3 | 113 | 74.89 |
| Composition B | 30 | Composition G | 10 | 3 | 87 | 80.67 |
| Composition B | 30 | Composition H | 20 | 3 | 81 | 82.00 |
| Composition B | 30 | Composition I | 30 | 3 | 85 | 81.11 |
| Composition B | 30 | Composition D | 1 | 5 | 112 | 75.11 |
| Composition B | 30 | Composition E | 3 | 5 | 119 | 73.56 |
| Composition B | 30 | Composition F | 5 | 5 | 113 | 74.89 |
| Composition B | 30 | Composition G | 10 | 5 | 86 | 80.89 |
| Composition B | 30 | Composition H | 20 | 5 | 83 | 81.56 |
| Composition B | 30 | Composition I | 30 | 5 | 80 | 82.22 |

TABLE IX

Screening of DMAEA.MCQ Dispersion Polymers
(A Midwestern Tissue Mill DAF Water)

| Coagulant | Dosage (ppm) | Flocculant | Mole % DMAEA.MCQ | Dosage (ppm) | Turbidity Units (FTU) | % Turbidity Reduction |
|---|---|---|---|---|---|---|
| Control | | | | | 450 | |
| Composition C | 30 | Composition J | 10 | 3 | 78 | 82.67 |
| Composition C | 30 | Composition J | 10 | 5 | 79 | 82.44 |
| Composition C | 30 | Composition K | 30 | 3 | 78 | 82.67 |
| Composition C | 30 | Composition K | 30 | 5 | 74 | 83.56 |
| Composition C | 30 | Composition D | 1 | 3 | 78 | 82.67 |
| Composition C | 30 | Composition E | 3 | 3 | 80 | 82.22 |
| Composition C | 30 | Composition F | 5 | 3 | 78 | 82.67 |
| Composition C | 30 | Composition G | 10 | 3 | 78 | 82.67 |
| Composition C | 30 | Composition H | 20 | 3 | 77 | 82.89 |
| Composition C | 30 | Composition I | 30 | 3 | 77 | 82.89 |
| Composition C | 30 | Composition D | 1 | 5 | 77 | 82.89 |
| Composition C | 30 | Composition E | 3 | 5 | 80 | 82.22 |
| Composition C | 30 | Composition F | 5 | 5 | 77 | 82.89 |
| Composition C | 30 | Composition G | 10 | 5 | 77 | 82.89 |
| Composition C | 30 | Composition H | 20 | 5 | 74 | 83.56 |
| Composition C | 30 | Composition I | 30 | 5 | 68 | 84.89 |

Changes can be made in the composition, operation and arrangement of the method of the present invention described herein without departing from the concept and scope of the invention as defined in the following claims:

We claim:

1. A method for clarifying ink-laden paper process water, comprising:

dosing the water with a coagulant to produce a coagulated process stream;

dosing solids from the coagulated process stream with a hydrophilic dispersion polymer, to form a floc containing ink and other impurities, wherein said hydrophilic dispersion polymer consists essentially of:

(a) a cationic monomer represented by the following general formula (I):

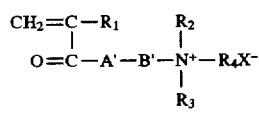

wherein $R_1$ is H or $CH_3$; each of $R_2$ and $R_3$ is an alkyl group having 1 to 2 carbon atoms; $R_4$ is H or an alkyl group of 1 to 2 carbon atoms; A' is an oxygen atom; B' is an alkylene group of 2 to 4 carbon atoms; and $X^-$ is an anionic counterion; and (b) a second monomer comprising (meth)acrylamide in an aqueous solution of a polyvalent anionic salt, wherein the polymerization of (a) and (b) is carried out in the presence of a polymer selected from the group consisting of an organic high molecular weight multivalent cationic water-soluble polymer containing at least one monomer of formula (I); and effecting solid-liquid separation of the floc from the process stream, wherein the solid-liquid separation is carried out by dissolved air flotation.

2. The process of claim 1, wherein the hydrophilic dispersion polymer is a copolymer of acrylamide and dimethylaminoethylacrylate methylchloride quaternary.

3. The method of claim 1, wherein the hydrophilic dispersion polymer has a cationic charge of from about 1% mol to about 30% mol.

4. The method of claim 1, wherein the flocculant has an intrinsic viscosity of from about 10.0 to about 22.0 deciliters per gram.

5. The method of claim 1, wherein the dosage of the hydrophilic dispersion polymer is from about 0.1 to about 100 parts per million on a product basis.

6. The method of claim 5, wherein the dosage of the hydrophilic dispersion polymer is from about 0.5 to about 10 parts per million on an actives basis.

7. The method of claim 1, wherein the coagulant is selected from the group consisting of poly(diallyl dimethyl ammonium chloride), amphoteric diallyl dimethyl ammonium chloride-containing copolymers and condensation polymers of dimethylamine/epichlorohydrin.

* * * * *